No. 751,993. PATENTED FEB. 9, 1904.
G. J. & H. G. PELSTRING.
SPEED REGULATOR FOR GENERATORS.
APPLICATION FILED MAY 11, 1903.
NO MODEL.
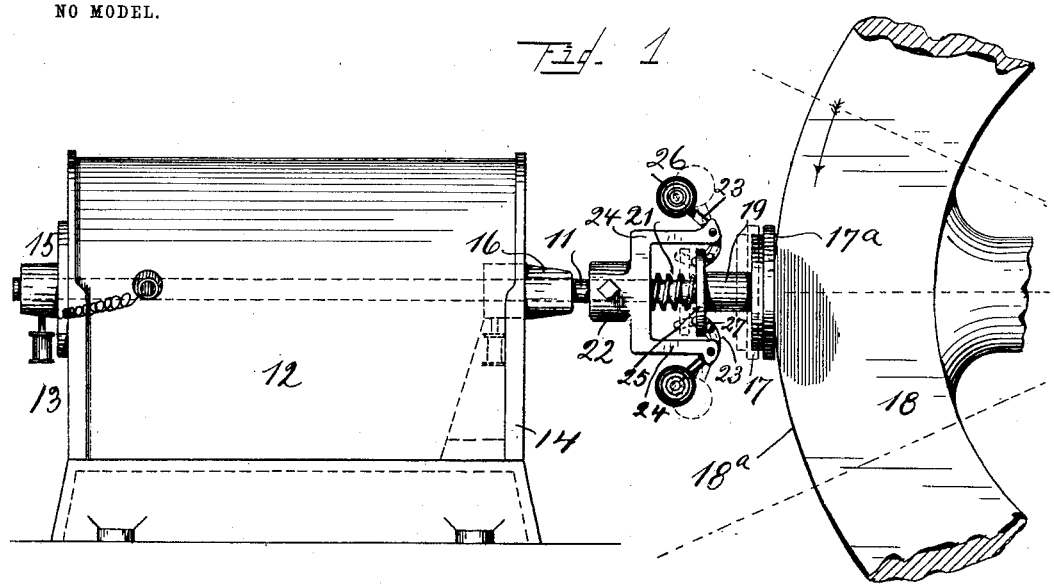
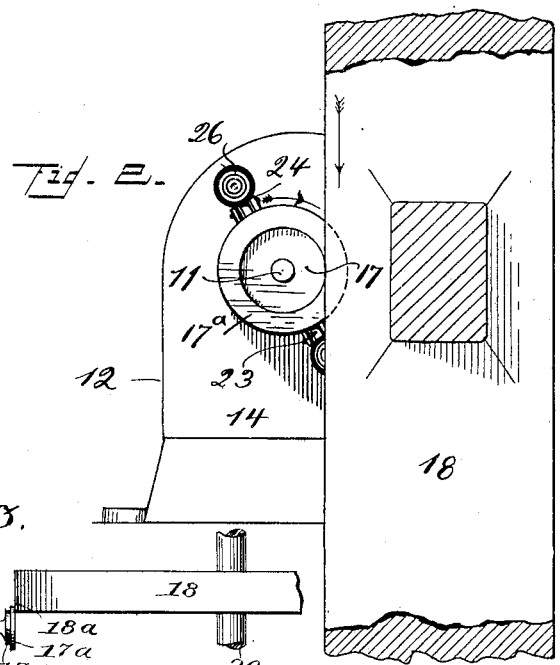
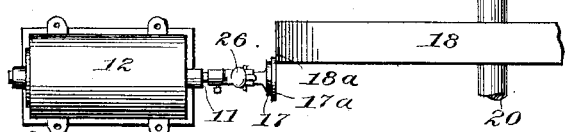
Witnesses
A. L. Kline
Albert W. Moebus
Inventors
George J. Pelstring
Henry G. Pelstring
by C. Spengel atty.

No. 751,993.

Patented February 9, 1904.

UNITED STATES PATENT OFFICE.

GEORGE J. PELSTRING, OF CINCINNATI, OHIO, AND HENRY G. PELSTRING, OF COVINGTON, KENTUCKY.

SPEED-REGULATOR FOR GENERATORS.

SPECIFICATION forming part of Letters Patent No. 751,993, dated February 9, 1904.

Application filed May 11, 1903. Serial No. 156,527. (No model.)

*To all whom it may concern:*

Be it known that we, GEORGE J. PELSTRING, of Cincinnati, Hamilton county, State of Ohio, and HENRY G. PELSTRING, of Covington, Kenton county, State of Kentucky, have invented certain new and useful Improvements in Speed-Regulators for Generators; and we do declare the following to be a clear, full, and exact description thereof, attention being called to the accompanying drawings, with the reference-numerals marked thereon, which form also a part of this specification.

This invention relates to a governor for regulating and equalizing the rotary speed of a device driven by means which transmit the power by frictional contact and the operating speed of which means is not strictly constant. A governor of this kind is particularly desirable in connection with electrical generators from which a current of constant quality is required. A condition which meets all these premises exists in explosive-engines using gas or vapor, which is ignited by an electrical spark, the current for which is furnished by a small generator driven by one of the moving parts of the same engine.

The object of this invention is to provide a governor for such a generator which is simple and efficient for the purpose and which may be readily placed in operative connection with an engine of the kind named.

Another object is to provide certain improvements over the regulator illustrated in our Patent No. 719,037, of January 27, 1903, and whereby the construction in general, and particularly of the means transmitting power and motion, is simplified.

In the following specification, and particularly pointed out in the claims, is found a full description of the invention, together with its operation, parts, and construction, which latter is also illustrated in the accompanying drawings, in which—

Figure 1 is a side view of such a generator, frequently also called a "sparking generator" or "sparker," the same placed in operative connection by frictional contact with the motor furnishing the driving power, which motor in this case is supposed to be an engine and the operative connection therewith being by the frictional contact with the fly-wheel of the same. Fig. 2 is an end view of the generator with parts of the fly-wheel in front of it, such parts being a part of the rim of the fly-wheel shown edgewise and an arm in section. Fig. 3, at reduced scale, shows the generator in top view and its arrangement as to position with reference to the fly-wheel and the shaft thereof.

11 is the armature-shaft of the sparking generator, the latter preferably inclosed in a casing, of which 12 is the side, and 13 and 14 are the heads. Shaft 11 is supported in bearings 15 and 16, preferably provided as forming parts of the heads. The shaft projects beyond one of these bearings, 16 in this case, the extended parts being of sufficient length to permit mounting and attachment of the speed-regulator and of the means whereby motion is received from fly-wheel 18 and imparted to the generator. These means consist of a disk 17, mounted at the extreme end of shaft 11, and the motion from the fly-wheel is received by the frictional contact between the two. This contact as to the fly-wheel is by a portion near one edge of its face $18^a$. As to the disk, it is by a limited portion of its outer side or face and near the edge thereof, as best shown in Figs. 2 and 3. Such a contact is obtained by placing the generator in such a position that its shaft is parallel to the side of the fly-wheel and at right angles to the periphery or to the shaft 20 thereof. This point of contact may be selected anywhere around the periphery of the fly-wheel to suit best the position of the generator or other conditions governing. (See dotted lines in Fig. 1, indicating longitudinal axis of the armature-shaft in different other positions.) One of the contacting surfaces at least consists of a friction-promoting material—like leather, for instance. In this case this material (indicated by $17^a$) is secured to the outer side of disk 17—that is, the side nearest the face of the fly-wheel. Disk 17 is mounted on shaft 11 in a manner to impart its rotation received from the fly-wheel to said shaft, but being at the same time free of a longitudinal movement thereon and to and from the fly-wheel, and it is provided for such a purpose with a sleeve 19 to furnish and maintain sufficient support during such movement. It is held in yielding contact with the fly-wheel by a spring 21, supported on shaft 11 and bearing with its outer end against the inner end of sleeve 19, while its inner end rests against a hub 22, fixedly attached to shaft 11. The attachment of the disk to shaft 11, whereby the two are connected for rotation, is by means of levers 23, pivotally carried at the ends of arms 24, forming rigidly-connected parts of hub 22. The inner ends of these levers occupy slots or notches in the edge of a flange 25, which forms a part of sleeve 19 and disk 17, so that it will be readily understood how this latter is operatively connected to shaft 11 for rotation therewith by the rigidly-attached hub 22.

For purposes of controlling the speed of the generator automatically with a view to maintain it constant the contact between disk and fly-wheel is made dependent on the speed attained by shaft 11, so that if such speed rises above the desired normal such contact is interrupted, while as soon as it sinks below the normal the contact is reëstablished or intensified. This controlled dependency is obtained by means susceptible to centrifugal action—as, for instance, by weights or governor-balls 26—at the outer ends of levers 23 and which, as shown in dotted lines in Fig. 1, will be thrown outwardly as the speed increases. This will affect in corresponding degree the inner ends of levers 23, which by projections 27 on them are enabled to act against flange 25 on the sleeve of disk 17. This action is such as to tend to move the disk away from the fly-wheel, as shown in dotted lines in Fig. 1, which movement causes a simultaneous compression of spring 21, whereby as soon as the speed diminishes the contact is again established. As will be observed, this construction is cheap and efficient, and in case of any irregularity in the motion of the fly-wheel no damage can result to the governor mechanism or bearings of shaft 11, since the spring allows the shaft to readily yield in the direction of its length.

Having described our invention, we claim as new—

1. In a speed-regulator, the combination of a driven shaft, a friction-disk mounted thereon and operatively connected thereto for rotation but free to move longitudinally, a driving-wheel, a shaft on which it is mounted and to which the driven shaft is arranged at right angles, a spring to normally maintain a part of the side of the disk near the edge thereof in operative but yielding frictional contact with the face of said driving-wheel, and mechanism susceptible to the action of centrifugal force also mounted on the driven shaft and operatively connected to the sliding disk thereon and in a manner that when under the influence of such a force it may oppose the action of the spring.

2. In a speed-regulator, the combination of a driven shaft, a friction-disk mounted thereon and operatively connected thereto for rotation but free to move longitudinally, a driving-wheel, the driven shaft being arranged so as to be parallel to the side thereof, a spring to normally maintain a part of the side of the disk near the edge thereof, in operative but yielding frictional contact with the face of said driving-wheel, and mechanism susceptible to the action of centrifugal force also mounted on the driven shaft and operatively connected to the sliding disk thereon and in a manner that when under the influence of such a force it may oppose the action of the spring.

In testimony whereof we hereunto set our signatures in presence of two witnesses.

GEORGE J. PELSTRING.
HENRY G. PELSTRING.

Witnesses:
C. SPENGEL,
ALBERT A. MOEBUS.